US008822020B2

(12) United States Patent
Grigo et al.

(10) Patent No.: US 8,822,020 B2
(45) Date of Patent: Sep. 2, 2014

(54) MOLDING COMPOSITION COMPOSED OF VINYL CHLORIDE POLYMER OR POLYVINYLCHLORIDE FILM PRODUCED FROM THE MOLDING COMPOSITION AND PROCESS FOR PRODUCTION OF A FILM OR OF A FILM WEB

(75) Inventors: Thorsten Grigo, Teising (DE); Roland Schrauf, Neuötting (DE); Werner Kürmayer, Winhöring (DE)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 1648 days.

(21) Appl. No.: 11/814,252

(22) PCT Filed: Jun. 21, 2005

(86) PCT No.: PCT/EP2005/006666
§ 371 (c)(1),
(2), (4) Date: Jul. 18, 2007

(87) PCT Pub. No.: WO2006/079363
PCT Pub. Date: Aug. 3, 2006

(65) Prior Publication Data
US 2008/0206535 A1    Aug. 28, 2008

(30) Foreign Application Priority Data

Jan. 27, 2005    (DE) .......................... 10 2005 003 776

(51) Int. Cl.
| | | |
|---|---|---|
| *B32B 27/36* | (2006.01) | |
| *B29C 67/20* | (2006.01) | |
| *C08L 67/00* | (2006.01) | |
| *C08J 5/08* | (2006.01) | |
| *C08L 27/06* | (2006.01) | |
| *C08L 67/02* | (2006.01) | |
| *C08L 55/02* | (2006.01) | |
| *C08L 33/06* | (2006.01) | |

(52) U.S. Cl.
CPC .. *C08L 27/06* (2013.01); *C08J 5/08* (2013.01); *C08L 55/02* (2013.01); *C08L 33/06* (2013.01); *C08L 67/02* (2013.01); *C08J 2367/02* (2013.01); *C08J 2327/06* (2013.01)
USPC ............ 428/220; 264/175; 524/599; 525/213

(58) Field of Classification Search
USPC ........ 428/220; 264/176.1, 175; 524/277, 513, 524/176, 451, 426, 444
See application file for complete search history.

(56) References Cited

U.S. PATENT DOCUMENTS

| | | | | |
|---|---|---|---|---|
| 4,010,221 | A | * | 3/1977 | Gebhart et al. ................ 525/165 |
| 4,401,720 | A | | 8/1983 | Davis et al. |
| 4,652,409 | A | * | 3/1987 | Leese et al. .................... 264/448 |
| 5,001,192 | A | | 3/1991 | Sun |
| 2005/0027022 | A1 | * | 2/2005 | Michot et al. ................... 521/33 |
| 2007/0275236 | A1 | * | 11/2007 | Mussig et al. ................. 428/343 |
| 2009/0226662 | A1 | * | 9/2009 | Dyczko-Riglin et al. ...... 428/95 |

FOREIGN PATENT DOCUMENTS

| | | |
|---|---|---|
| DE | 27 16 853 A1 | 10/1978 |
| EP | 0 172 479 B1 | 2/1986 |
| EP | 172479 A2 * | 2/1986 |
| EP | 1066339 B1 | 9/1999 |
| EP | 1066339 B1 * | 10/2003 |
| JP | 2002167487 | 6/2002 |
| WO | WO 99/47605 A1 | 9/1999 |

OTHER PUBLICATIONS

Machine_English_Translation_of_EP172479_A1; Mucke, Rainer, Foil with a Mat and Rough Surface Based on Vinyl Chloride Polymers and Fillers, Feb. 26, 1986, EPO, whole document.*
Anonymous: "Poly(vinyl chloride)/plasticizer/copolyester blends" Research Disclosure, vol. 280, No. 021, Aug. 1987 XP002354035.

* cited by examiner

*Primary Examiner* — Aaron Austin
*Assistant Examiner* — Tahseen N Khan
(74) *Attorney, Agent, or Firm* — ProPat, L.L.C.

(57) ABSTRACT

The invention relates to a molding mass made from vinyl chloride polymer or polyvinylchloride at 5 to 94 wt. % and a K value of 50 to 90 additives at 2 to 25 wt. % and a polymer, whereby the weight percentages relate to the total weight of the molding mass. The polymer is a semi-crystalline or amorphous polyester. The film is produced from the molding mass by plastifying and fusing the same and calendering or extruding the same to give a film with a thickness of 100 microns to 1 mm. By means of subsequent in-line or off-line method steps, the film, for example, by means of drawing with a drawing degree of 1.3 to 7, can be further processed to give a thin high-shrinkage film.

38 Claims, No Drawings

MOLDING COMPOSITION COMPOSED OF VINYL CHLORIDE POLYMER OR POLYVINYLCHLORIDE FILM PRODUCED FROM THE MOLDING COMPOSITION AND PROCESS FOR PRODUCTION OF A FILM OR OF A FILM WEB

CROSS-REFERENCE TO RELATED APPLICATIONS

This application is being filed under Rule 1.371 as a National Stage Application of pending International Application No. PCT/EP2005/006666 filed Jun. 21, 2005, which claims priority to the following parent application: German Patent Application No. 10 2005 003 776.3, filed Jan. 27, 2005. Both International Application No. PCT/EP2005/006666 and German Patent Application No. 10 2005 003 776.3 are hereby incorporated by reference herein in their entirety.

FIELD OF THE INVENTION

The invention relates to a molding composition composed of vinyl chloride polymer or polyvinyl chloride making up from 5 to 94% by weight with a K value of from 50 to 90, additives making up from 2 to 25% by weight, and a polymer, where the percentages by weight are based on the total weight of the molding composition and also relates to a film produced from the molding composition and to a process for production of a film or of a film web.

A film or film web is produced from the molding composition via plastification followed by extrusion through a die or via calendering, and can be further processed in-line and/or off-line, for example by orientation.

BACKGROUND OF THE INVENTION

Plastified and rigid polyvinyl chloride compositions are known to be modified by addition of various additives in order to obtain the desired property profile. Known PVC compositions can be thermoformed and are suitable for a wide variety of applications, for example as packaging films, shrink films, and rigid films. Modification of PVC film is achieved by adding modifiers to improve impact resistance and to improve heat resistance, processing aids to improve processability and to improve the output of the production plant, lubricants to improve gelling behavior during manufacture, flow aids to improve thermoformability and orientability, matting agents to reduce gloss, and the like. The proportions by weight of the individual additives are, as a function of the requirement, from 0.1 to more than 40% by weight. The flowability and orientability of polyvinyl chloride compositions are preferably improved by using vinyl chloride copolymers.

EP-0 172 479 B1 discloses a film with a matt and rough surface, based on vinyl chloride polymers and on fillers. Lubricants and heat stabilizers are also added to this film. The filler used comprises starch making up from 1 to 15% by weight, based on the total weight of the film material. By virtue of this filler, good mattness and roughness together with minimum internal haze is achieved in polyvinyl chloride films based on vinyl chloride polymers with a fairly wide range of molecular weights. Vinyl chloride polymers that can be used here are vinyl chloride homopolymers or vinyl chloride copolymers, these having been prepared by one of the conventional polymerization processes, namely by emulsion polymerization, suspension polymerization, or bulk polymerization. The proportion of the comonomers in the copolymers is generally at most 20% by weight, based on the copolymer.

DE Auslegeschrift 27 16 853 discloses a film with a matt and rough surface which is composed of a vinyl chloride polymer, of a stabilizer, and of a lubricant, and which has been produced by a rolling-bank calendering process. The average molecular weight of an amount of from 10 to 40% by weight of the vinyl chloride polymer is from 110 000 to 190 000 and the average molecular weight of an amount of from 60 to 90% by weight of the vinyl chloride polymer is from 45 000 to 75 000, the weights always being based on the entirety of vinyl chloride polymer. The stabilizer is one selected from the group of the tin stabilizers, and the lubricant is one selected from the group of montanic esters, stearic acid, bisstearylethylenediamine, bispalmitoylethylenediamine, and glycerol oleate, the amount of stabilizer being from 0.5 to 2% by weight and the amount of lubricant being from 0.1 to 2% by weight, in each case based on vinyl chloride polymer. The modifier for impact resistance is one selected from the group of the acrylonitrile-butadiene-styrene, methyl methacrylate-butadiene-styrene, and methyl methacrylate-acrylonitrile-butadiene-styrene polymers, in an amount of from 3 to 15% by weight, based on vinyl chloride polymer.

EP1066339B1 describes a process for production of a film or of a sheet composed of a polyester resin composition by calendering. The polyester component of the resin is an amorphous or semicrystalline polyester whose crystallization half-life time from a molten state is at least 5 min. The polyester component is composed of at least 80 mol % of a diacid-radical component, of from 80 to 100 mol % of a diol-radical component, and from 0 to 20 mol % of a modifying diol. The diacid-radical component is based on 100 mol % of diacid radical, and the diol radical is based on 100 mol % of diol radical. The resin composition includes an additive which is an internal lubricant or antislip agent or a mixture thereof. The amount of the additive added is from 0.01 to 10% by weight, based on the total weight of the resin composition.

Surprisingly, amorphous or semicrystalline polyester resin compositions of this type are suitable for calendering with the aid of conventional calendering processes for production of uniform films or sheets. Polyester resin compositions of this type are marketed as Tsunami® by Eastman Chemical Corp., Tennessee, USA. The polyester compositions are usually used for production of polyester films, being base polymers generally making up more than 96% by weight, based on the total weight of the polyester films.

Modifiers used in conventional PVC films comprise conventional polymers composed of acrylonitrile-butadiene-styrene, methyl methacrylate-butadiene-styrene, methyl methacrylate-acrylonitrile-butadiene-styrene, methyl methacrylate and chlorinated polyethylene, polymethyl methacrylate and ethylene-vinyl acetate as impact-resistance components in an amount of from 1 to 20% by weight, based on the weight of the PVC film. Usual lubricants in PVC molding compositions from which PVC films are produced are fatty acids, fatty alcohols, fatty acid amides, metal soaps, esters of fatty acids with mono- or polyhydric alcohols, esters of dicarboxylic acids with mono- or polyhydric alcohols, esters of fatty acids and dicarboxylic acids with polyhydric alcohols, the substances known as mixed esters or complex esters, esters of phthalic acid with mono- or polyhydric alcohols, or natural or synthetic waxes. The amount of lubricants is from 0.1 to 2%, based on the total weight of the molding composition. Known heat stabilizers are tin stabilizers, in particular tin carboxylates, tin mercaptides, and tin dioglycolates. It is also possible to use metal stabilizers based on calcium, zinc, barium, cadmium, and to use other metal-free organic stabilizers and inorganic stabilizers, examples being chlorine scavengers based on dihydrotalcite. The proportion of heat stabilizers is generally from 0.3 to 5% by weight, based on the total weight of the molding composition.

SUMMARY OF ADVANTAGEOUS EMBODIMENTS OF THE INVENTION

It is an object of the invention to provide a molding composition for the production of films, and also to provide films based on polyvinyl chloride or vinyl chloride polymer in which improvement has been achieved in at least some of the following properties in comparison with PVC films which comprise standard modifiers as impact-resistance components: thermoformability, orientability, toughness, pasteurizability, and optical defects, such as fish-eyes, thus increasing the light transmittance, color neutrality, light fastness, and heat resistance of the films.

DETAILED DESCRIPTION OF ADVANTAGEOUS EMBODIMENTS OF THE INVENTION

The invention achieves this object in a molding composition of the type described in the introduction in that the molding composition is a blend composed of vinyl chloride polymer or polyvinyl chloride and the polymer is composed of semicrystalline or amorphous polyester whose crystallization half-life time in the molten state is at least equal to or greater than 5 minutes up to infinity, and in that the proportion of the polyester is from 5 to 90% by weight of the molding composition.

In an embodiment of the invention, the polyvinyl chloride makes up from 60 to 80% by weight of the molding composition and its K value is from 50 to 65, and the additives make up from a proportion of 2 to 16% by weight of the molding composition, and the polyester makes up a proportion of from 10 to 45% by weight of the molding composition.

In one embodiment of the invention, the polyvinyl chloride, prepared by the bulk, emulsion, or suspension process, makes up from 50 to 75% by weight of the molding composition and its K value is from 50 to 65, and the proportion of the polyester is from 10 to 20% by weight, in particular 15% by weight, of the molding composition.

In another embodiment of the inventive molding composition, the polyvinyl chloride has a K value of 60, and makes up a proportion of from 60 to 62% by weight of the molding composition, and the polyester makes up a proportion of from 20 to 30% by weight of the molding composition. It is preferable that the proportions of the polyvinyl chloride are from 70 to 72% by weight of the molding composition, and that the proportion of the polyester is 15% by weight of the molding composition. In particular, the polyvinyl chloride has a K value of 60, and makes up a proportion of from 60 to 62% by weight of the molding composition, and the polyester makes up a proportion of from 23 to 27% by weight, in particular of 25% by weight, of the molding composition.

The additives of the molding composition have advantageously been selected from the group of modifiers, preferably high-molecular-weight polymers, stabilizers, waxes, antiblocking agents, colorants, plasticizers, processing aids. In one inventive embodiment, the vinyl chloride polymer encompasses two components and the molding composition therefore comprises vinyl chloride polymer whose K value is from 50 to 65 making up a proportion of from 55 to 70% by weight of the molding composition and vinyl chloride polymer whose K value is from 70 to 90 making up a proportion of from 15 to 25% by weight of the molding composition. The vinyl chloride polymer is preferably composed of vinyl chloride copolymer which contains, as comonomer, ethylene, propylene, or vinyl acetate making up a proportion of from 1 to 45% by weight of the vinyl chloride copolymer. The polyester present in the blend of the molding composition admixed with the molding composition was in powder form, pellet form, or granule form.

The molding composition is used to produce films, film webs, profiles, sheets, and moldings.

Inventive films or inventive film webs are obtained by extruding or, respectively, calendering the molding composition to give an unoriented film or, respectively, film web whose thickness is from 100 µm to 1 mm. This film or film web can be used directly or else also. oriented in a subsequent step of the process (in-line and/or off-line). The degree of stretching can assume values of from 1.3 to 7, in particular from 3 to 4. The orientation process gives thinner films with large dimensional change in the direction of stretching (shrink films). The degree of stretching is given by the quotient calculated from film thickness prior to the orientation process and film thickness after the stretching procedure. The thickness of the oriented film is from 20 µm to 800 µm, in particular from 35 to 200 µm. The haze of the film is from 2 to 5% for film thickness of 50 µm and from 9 to 16% for film thickness of 200 µm.

The longitudinal/transverse tensile impact resistance of the oriented film for film thickness of 50 µm is in particular from 150 to 230/from 580 to 980 $kJ/m^2$. The longitudinal/transverse tensile impact resistance of an unoriented film whose thickness is 200 µm is from 230 to 330 $kJ/m^2$/ from 330 to 420 $kJ/m^2$.

The longitudinal/transverse modulus of elasticity of the inventive film is from 1400 to 3500 $N/mm^2$ / from 1400 to 3500 $N/mm^2$, for film thickness in the range from 35 to 200 µm.

The process for production of a film or of a film web composed of a molding composition encompasses the steps of:
(a) mixing of a polyvinyl chloride or vinyl chloride polymer in powder form, pellet form, or granule form which makes up from 5 to 94% by weight of the molding composition and whose K value is from 50 to 90 with additives which make up a proportion of from 2 to 25% by weight of the molding composition;
(b) addition of a semicrystalline or amorphous polyester in powder form, pellet form, or granule form, making up a proportion of from 5 to 90% by weight of the molding composition;
(c) plastification and melting of the molding composition prepared as in steps (a) and (b);
(d) extrusion or calendering of the molten molding composition to give a film or film web at temperatures of from 150 to 250° C., and
(e) if appropriate, orientation of the film or film web in an in-line or off-line process, the degree of stretching used being from 1.3 to 7.

Further embodiments of the process are found in the features of claims 24 to 28.

The films of the invention are used inter alia as packaging films, shrink films, furniture films, ceiling cassette films, or card films, and also as inscribable and printable films. Since the films are thermoformable and/or orientable, they are particularly used as packaging films and shrink films.

Film examples are used below for detailed explanation of the invention.

The film examples set out in tables 1 and 2 below comprise comparative examples 1 to 3 and 7 and inventive examples 4 to 6. Within the formulation of the respective films, the chemical names of the individual components of the films, the names of their trademarks or grades, and the respective supplier are stated.

Comparative examples 1 to 3 relate to PVC films where proportions of PVC in the films decrease, and proportions of vinyl chloride-vinyl acetate copolymers in the films increase from comparative example 1 to comparative example 3. Comparative example 7 is a PET film with a proportion of 97.5% by weight of polyester in the film. This polyester is a polyester as disclosed and protected by patent law in EP-0 1 066 339 B1 of Eastman Chemical Co., Tennessee, USA.

Measurement of the crystallization half-life time of the polyester is described in detail in claim 1 of the European patent, expressly incorporated herein by way of reference.

In the inventive films of examples 4 to 6, the proportion of PVC in the respective PVC/PET blends decreases from example 4 to example 6, and proportions of the polyester of the abovementioned European patent increase, the polyester having been used as modifier instead of the vinyl chloride/vinyl acetate copolymer. The proportions by weight of the other additives of the films in comparative examples 1 to 3 and in inventive examples 4 to 6 were in each case the same.

The term vinyl chloride polymer means vinyl chloride homopolymers and/or vinyl chloride copolymers. Polyvinyl chloride here is the polymer produced by homopolymerization of vinyl chloride and therefore counts as a vinyl chloride homopolymer. The K value of the vinyl chloride polymers corresponds to a parameter correlated with the average degree of polymerization or the average molecular weight and is known to be adjusted by maintaining an appropriate temperature during the polymerization reaction and/or by adding regulators. The K value of a vinyl chloride polymer is determined to DIN 53 726, by dissolving the vinyl chloride polymer in cyclohexanone.

In one embodiment, the molding composition comprises polyvinyl chloride whose K value is 60, making up from 50 to 75% by weight, based on the total weight of the molding composition. As modifier with respect to tensile impact resistance, a methyl methacrylate-butadiene-styrene copolymer is used, making up, for example, 10% by weight, based on the molding composition. The inventive molding composition comprises a small amount of processing aid, for example a methyl methacrylate-acrylate ester-styrene copolymer making up from 1 to 2% by weight, based on the molding composition, in particular 1% by weight. An organotin-sulfur stabilizer has been provided as heat stabilizer, examples being dioctyltin bis(2-ethyl-1-hexyl thioglycolate) making up more than 70% and monooctyltin tris(2-ethyl-1-hexyl thioglycolate) making up less than 30%, in each case based on the amount of the stabilizer. The proportion of the stabilizer in the molding composition is from 1 to 2% by weight, in particular 1.5% by weight.

Lubricants used preferably comprise mixtures of complex esters and of glycerol esters, and also comprise saturated, unbranched aliphatic monocarboxylic acids, such as palmitic acid and stearic acid. The effective amount of lubricant is usually from 0.1 to 2.5% by weight, in particular 0.3% by weight, based on the total weight of the molding composition. The second substantial constituent of the blend composed of vinyl chloride polymer or polyvinyl chloride and of a polymer is a semicrystalline or amorphous polyester, the amount of which used is from 5 to 90% by weight, based on the molding composition. This polyester is a commercially available product from Eastman Chemical Co., Tennessee, USA, and is described in European patent EP 1 066 339 B1. This polyester is a constituent of the inventive molding composition, replacing the conventional copolymer composed of vinyl chloride and vinyl acetate. An amount of from 0.1 to 0.5% by weight, in particular 0.2% by weight, of kaolin or chalk, based on the amount of the molding composition, is also usually added as antiblocking agent.

It is, of course, also possible to color the molding composition with the aid of appropriate colorants or of appropriate dyes, and white coloring here is preferably undertaken using titanium dioxide and/or chalk. Antimony trioxide can also be added as flame retardant, and quaternary ammonium salt can be added as preferred antistatic agent. It is also possible to add conventional plasticizers and other processing aids. Preparation of the molding composition used as starting material in production of the inventive films takes place via mixing of a polyvinyl chloride or a vinyl chloride polymer in powder form, pellet form, or granule form making up from 5 to 94% by weight and with a K value of from 50 to 90 with additives whose proportion is from 2 to 25% by weight, based in each case on the total weight of the molding composition, by adding a semicrystalline or amorphous polyester in powder form, pellet form, or granule form, making up a proportion of from 5 to 90% by weight of the molding composition. The molding composition is plastified and melted, and is calendered to give a film or film web, which is produced by passage through a nip between two calender rolls of a roll calender at: calender-roll temperatures of from 150 to 250° C. The kneading-roller-calendering process known for vinyl chloride polymer is used here. Upstream of each nip, prior to the rolls of the 4- to 6-roll calender, which generally encompasses polished, hard-chromed rolls, a rotating bank forms, known as a rolling bank. The calendered film is drawn off from the final calender roll and cooled by means of cooling rolls, and wound up. A longitudinal and/or transverse stretching process with a degree of stretching of from 1.3 to 7 can also, for example, take place subsequently in an in-line and/or off-line step of the process. This makes the film thinner and gives it shrinkage capability (high dimensional change values in the direction of stretching).

The thickness of the film is generally from 100 μm to 1 mm and the film is, if necessary, stretched using a degree of stretching of from 1.3 to 7, to thickness values of, for example, from 20 to 250 μm. The degree of stretching is the quotient calculated from the film thickness prior to the orientation process and the film thickness after the stretching procedure and is preferably from 3 to 4. The thickness of the resultant films is therefore from 20 to 250 μm, preferably from 35 to 200 μm.

The following properties were determined on the films.
1. Thickness was determined by a method based on DIN 53370 by means of a 543/250 B tester from Mitutoyo, Japan. For the point measurements, the film was placed between the opened measurement surfaces of the tester and these were then gently closed. Thickness was read off from the tester.
2. Haze is the term for the percentage proportion of scattered light in the forward direction, based on the total light flux passing through the film. Haze is measured using a tester developed in-house, its geometry being similar to the geometry of the ASTM D1003-61 standard tester.
3. Pasteurizability is measured to an in-house specification. For this, tetrahydrofuran is used to bond the film around a glass cylinder and the film is stored at the stated pasteurization temperature in a water bath. After storage in water, the film is removed from the glass cylinder and its haze is determined.
4. Canting radius. This measurement is carried out to an in-house specification. A female mold is used to mold the film in vacuo in a section of a mold at three different temperatures rising in stages of 20° C., to give small round pots. The radius between the pot wall and the pot base is measured optically. This radius is initially large and decreases with increasing flowability of the film during the thermoforming procedure, i.e. it approaches more closely the radius of the transition between the wall and the base of that section of the mold. Canting radius is stated here only for a temperature of 100° C.

5. Tensile impact resistance: The measurement takes place longitudinally and transversely to DIN EN ISO 8256 by means of a pendulum impact tester. A single pendulum impact is used here to provide sufficient tension to fracture the film. The energy consumed here is determined from the energy loss of the pendulum, corrected for friction in the stay-set indicator and for other energy losses.

6. Measurement of modulus of elasticity: Modulus of elasticity is determined longitudinally and transversely to DIN EN ISO 527. For this, a film strip of width 15 mm and length 170 mm is clamped between two clamps, the clamped length being 100 mm, and subjected to tensile strain with a prescribed constant advance rate of 10 mm/min, with prescribed test conditions, for example standard temperature and humidity. Modulus of elasticity is determined as curve gradient from the tensile force/length change graph recorded.

7. Transverse dimensional change. This measurement is carried out to DIN 53377. For this, the film is placed for 30 s in a water bath at a prescribed temperature of 75° C. and 95° C. The dimensional change that has occurred after this time is measured at room temperature.

8. Start of shrinkage: The temperature stated—rounded to 5° C. steps—is that at which the dimensional change of the film transversely is smaller than −1% and its dimensional change is greater than −5%.

9. Fish-eyes: This value is recorded by means of an FSP 600 camera inspection system from Optical Controlsystem, Germany, which detects defects affecting optical properties, for example fish-eyes, thermally degraded material, bubbles, and the like during the calendering of the film by the transmittance method. Defect sizes in the range from 500 to 2000 μm are recorded and the number of defects per 10 m² of film area is stated.

10. Heat resistance: A mixture to be studied, composed of PVC and of additives and of other polymers is roll-milled on a 2-roll mill using defined parameters, such as a roll surface temperature of 185° C., a bank temperature of 180° C., a roll speed of 6.7 m/min for roll 1 and 6.9 m/min for roll 2, and film thickness of 400 μm. The degree of yellowing, i.e. the level of thermal degradation, is assessed visually as a function of time and qualitatively graded using grades 1 to 6 (school grade system), grade 1 indicating little degradation and grade 6 indicating severe degradation. For documentation it is also possible to take small specimens at short time intervals and mount a series of these on a durable substrate.

11. Color neutrality: Colorimetric measurements are carried out on the films to DIN 6174 with specular component. For this, five plies of the films are placed on a glazed white tile.

12. Sun test: In this test, an area of about 480 cm² of films is placed in a specimen chamber and irradiated with light whose wavelength range is from 270 to 1100 nm, using 585 W/m² of source power. After in each case 24 hours the color of the single ply of film is tested to DIN 6174 with specular component, and a comparison is made with an unirradiated sample of film. The time expired before a color deviation of dE=5.0 occurs is determined.

Table 1 collates the formulations, the raw materials, and their suppliers, and the chemical names of the raw materials, and table 2 collates the properties and the dimensional units for film thicknesses of 200 μm and 50 pm for comparative examples 1 to 3 and 7 and for inventive examples 4, 5, and 6.

From this it is apparent that the haze of the inventive films of inventive examples 4 and 5 is smaller than that of the films of comparative examples 1 and 3. The haze of an oriented film whose thickness is 50 μm is from 2 to 5%. The inventive films can be pasteurized at a temperature of from greater than 50° C. up to 90° C., whereas this temperature is lower than 50° C. for the films of the comparative examples. As polyester content rises in the inventive films, the temperature for pasteurization approaches the temperature of 85° C. for the pasteurization of the film of comparative example 7.

The canting radius of the inventive films of thickness 200 μm of examples 4 and 5 is lower than that of the film of example 1, implying better thermoformability of the inventive films. The canting radius is from 1.2 to 2.0 mm, in particular from 1.4 to 1.8 mm, at a temperature of 100° C.

Longitudinal/transverse tensile impact resistance is markedly greater in the inventive films than in the films of comparative examples 1 to 3 and 7.

Longitudinal/transverse modulus of elasticity is lower in the inventive films than in the films of comparative examples 1 to 3 and approximately equal to the modulus of elasticity of the straight PET film of example 7. Longitudinal/transverse modulus of elasticity of the inventive films is from 1400 to 3500 N/mm²/from 1400 to 3500 N/mm², for film thickness in the range from 50 to 200 μm.

Transverse dimensional changes of the inventive films at 95° C. are up to 10% greater than those of the comparative films, while at a temperature of 75° C. the dimensional changes of the inventive film and of the comparative films are approximately equal. Since, however, the maximum degree of stretching and therefore the maximum achievable dimensional change in the PET-free films is subject to restriction and leads to a maximum of 66% dimensional change (example 3), in the PET-containing formulations the degree of stretching can be increased without break-off to achieve values around 72% (example 6)—a substantial improvement in this property. The dimensional change of the inventive films through transverse shrinkage is from 20 to 70% at a temperature of 75° C. and from 45 to 80% at a temperature of 95° C.

The start of shrinkage of all of the films occurs at approximately the same temperature of 60° C. The number of optical defects in the inventive films is smaller by a factor of 3 than in the films of comparative examples 1 to 3, being up to 10 per 10 m², the number therefore being smaller than or equal to 10.

With regard to color neutrality, the ΔL*/Δa*/Δb* values of the inventive films differ only slightly from the same values of the film of comparative example 1, this film having been used as standard. The chromaticity coordinates of the standard film are: L*=91.77, a*=0.12, and b*=3.38. Table 2a states the ΔL*/Δa*/Δb* deviations from the chromaticity coordinates of the standard film. The deviations in the examples show that no great differences are found between the examples. The chromaticity coordinates of the film are in the ranges L*=from 91 to 93, a*=from −0.2 to +0.2, and b*=from 3 to 4.

The sun test shows that the time expired before color deviation in the inventive films is longer than in comparative examples 1 and 3. For example, the time expired before occurrence of a color deviation is 8.8 h and, respectively, 14.5 h in the inventive films of examples 4 and 6, whereas a color deviation occurs after 6.6 h and, respectively, 4.2 h in comparative examples 1 and 3.

TABLE 1a

| Formulation | Example of raw material (supplier) | Chemical name | PVC films Comparative example 1 | Comparative example 2 | Comparative example 3 |
|---|---|---|---|---|---|
| M/S PVC | VINNOLIT S 3160 (Vinnolit) | Polyvinyl chloride (prepared by the bulk or suspension process with K value 60 | 86 | 56 | 16 |
| Modifier | KANE ACE B 580 (Kaneka) | Methyl methacrylate-butadiene-styrene copolymer | 10 | 10 | 10 |
| Processing aid | KANE ACE PA 101 (Kaneka) | Methyl methacrylate-acrylate ester-styrene copolymer | 1 | 1 | 1 |
| Stabilizer | THERMOLITE 890F (Arkema) | Dioctyltin bis(2-ethyl-1-hexyl thioglycolate): >70% Monooctyltin tris(2-ethyl-1-hexyl thioglycolate): <30% | 1.5 | 1.5 | 1.5 |
| Wax A | Ligalub 74 KE (Greven Fett-Chemie) | Mixture of complex esters and glycerol esters | 1 | 1 | 1 |
| Wax B | Pisterene 4900 (Unichema) | Saturated, unbranched aliphatic monocarboxylic acids, mainly palmitic acid and stearic acid | 0.3 | 0.3 | 0.3 |
| Polyester | Tsunami (Eastman) | see EP 1 066 339 B1 | 0 | 0 | 0 |
| VAC copo | VINNOLIT S 3157/11 (Vinnolit) | Copolymer composed of vinyl chloride and vinyl acetate (vinyl acetate content 11%) | 0 | 30 | 70 |
| Antiblock | MICROCARB LB 10 T (Reverté) | Chalk | 0.2 | 0.2 | 0.2 |
| Stretching parameters | Unit | | | | |
| Max. degree of stretching | No unit (quotient calculated from prefilm thickness and thickness after stretching procedure) | | 2.5 | 3 | 3.5 |
| Stretching temperature (film temp.) | [° C.] | | 100 | 100 | 105 |

TABLE 1b

| Formulation | Example of raw material (supplier) | Chemical name | PVC/PET/Blend Inventive example 4 | Inventive example 5 | Inventive example 6 | PET film Comparative example 7 |
|---|---|---|---|---|---|---|
| M/S PVC | VINNOLIT S 3160 (Vinnolit) | Polyvinyl chloride (prepared by the bulk or suspension process with K value 60 | 71 | 61 | 51 | 0 |
| Modifier | KANE ACE B 580 (Kaneka) | Methyl methacrylate-butadiene-styrene copolymer | 10 | 10 | 10 | 0 |
| Processing aid | KANE ACE PA 101 (Kaneka) | Methyl methacrylate-acrylate ester-styrene copolymer | 1 | 1 | 1 | 1 |
| Stabilizer | THERMOLITE 890F (Arkema) | Dioctyltin bis(2-ethyl-1-hexyl thioglycolate): >70% Monooctyltin tris(2-ethyl-1-hexyl thioglycolate): <30% | 1.5 | 1.5 | 1.5 | 0 |
| Wax A | Ligalub 74 KE (Greven Fett-Chemie) | Mixture of complex esters and glycerol esters | 1 | 1 | 1 | 1 |
| Wax B | Pisterene 4900 (Unichema) | Saturated, unbranched aliphatic monocarboxylic acids, mainly palmitic acid and stearic acid | 0.3 | 0.3 | 0.3 | 0.3 |
| Polyester | Tsunami (Eastman) | see EP 1 066 339 B1 | 15 | 25 | 35 | 97.5 |
| VAC copo | VINNOLIT S 3157/11 (Vinnolit) | Copolymer composed of vinyl chloride and vinyl acetate (vinyl acetate content 11%) | 0 | 0 | 0 | 0 |
| Antiblock | MICROCARB LB 10 T (Reverté) | Chalk | 0.2 | 0.2 | 0.2 | 0.2 |
| Stretching parameters | Unit | | | | | |
| Max. degree of stretching | No unit (quotient calculated from prefilm thickness and thickness after stretching procedure) | | 3 | 3.5 | 4 | 5 |
| Stretching temperature (film temp.) | [° C.] | | 100 | 100 | 100 | 90 |

TABLE 2a

| Film properties | Unit | PVC films | | | | | |
| --- | --- | --- | --- | --- | --- | --- | --- |
| | | Comparative example 1 | | Comparative example 2 | | Comparative example 3 | |
| Thickness | μm | 200 | 50 | 200 | 50 | 200 | 50 |
| Haze | % | 12 | 5 | / | / | 13 | 8 |
| Pasteurizability | °C. | <50 | <50 | <50 | <50 | <50 | <50 |
| Canting radius at 100° C. | mm | 3 | / | / | / | / | / |
| Tensile impact resistance (longitudinal/transverse) | kJ/m² | 250/300 | / | / | / | 250/320 | 280/550 |
| Modulus of elasticity (longitudinal/transverse) | N/mm² | 2010/1920 | 2000/3400 | / | / | / | 2300/3500 |
| Transverse dimensional change at 95° C. | % | / | −50 | / | −60 | / | −66 |
| Transverse dimensional change at 75° C. | % | / | −8 | / | −50 | / | −55 |
| Start of shrinkage | °C. | / | 65 | / | 60 | / | 55 |
| Fish-eyes | /10 m² | ~40 | / | ~30 | / | ~30 | / |
| Heat resistance (after 25 min of waiting time) | grade | 2 | / | / | / | 4 | / |
| Color neutrality (standard = inventive example 1) | ΔL/Δa/Δb | / | Standard L* = 91.77 a* = −0.12 b* = 3.38 | / | / | / | 0.74/0.14/0.27 |
| Sun test (to achievement of dE 5) | hours | 6.6 | / | / | / | 4.2 | / |

TABLE 2b

| Film properties | Unit | PVC/PET blend | | | | | | PET film | |
| --- | --- | --- | --- | --- | --- | --- | --- | --- | --- |
| | | Inventive example 4 | | Inventive example 5 | | Inventive example 6 | | Example 7 | |
| Thickness | μm | 200 | 50 | 200 | 50 | 200 | 50 | 200 | 50 |
| Haze | % | 9 | 3 | 10 | 4 | 16 | 5 | / | / |
| Pasteurizability | °C. | 75 | 75 | 75 | 75 | 80 | 80 | 85 | 85 |
| Canting radius at 100° C. | mm | 1.8 | / | 1.6 | / | 1.4 | / | / | / |
| Tensile impact resistance (longitudinal/transverse) | kJ/m² | 330/420 | 180/580 | 330/360 | 230/690 | 230/330 | 150/980 | 280/310 | 170/1600 |
| Modulus of elasticity (longitudinal/transverse) | N/mm² | 1590/1400 | 1600/2650 | 1660/1430 | 1870/3000 | 1890/1480 | 1490/1420 | 1640/1350 | 1500/1300 |
| Transverse dimensional change at 95° C. | % | / | −60 | / | −66 | / | −72 | / | −75 |
| Transverse dimensional change at 75° C. | % | / | −37 | / | −47 | / | −56 | / | −65 |
| Start of shrinkage | °C. | / | 60 | / | 60 | / | 60 | / | 60 |
| Fish-eyes | /10 m² | ~10 | / | ~10 | / | ~10 | / | ~5 | / |
| Heat resistance (after 25 min of waiting time) | grade | 2 | / | / | / | 2 | / | 1 | / |
| Color neutrality (standard = inventive example 1) | ΔL/Δa/Δb | / | −0.62/0.18/0.34 | / | −0.04/−0.04 0.36 | / | / | / | / |
| Sun test (to achievement of dE 5) | hours | 8.8 | / | / | / | 14.5 | / | / | / |

What is claimed is:

1. A calenderable molding composition comprising (i) vinyl chloride polymer or polyvinyl chloride in an amount of from 5 to 94% by weight, said vinyl chloride polymer or polyvinyl chloride having a K value of from 50 to 90, (ii) additives making up from 2 to 25% by weight, and (iii) a polymer comprising semicrystalline or amorphous polyester whose crystallization half-life time in the molten state is at least equal to or greater than 5 minutes, wherein the molding composition is a blend of vinyl chloride polymer or polyvinyl chloride and of the polyester as modifier for orientability, the proportion of the polyester is from 5 to 90% by weight of the molding composition, and the foregoing percentages by weight are based on the total weight of the molding composition, a film formed from said molding composition is oriented using a transverse stretching ratio of from 3 to 7, a calendared film formed from said molding; composition exhibits a transverse shrinkage of from 45 to 80% at a temperature of 95° C. and a film having a thickness of 50 microns formed from said molding composition exhibits a haze ranging from 2 to 5%.

2. The molding composition as claimed in claim 1, wherein polyvinyl chloride makes up from 60 to 80% by weight of the molding composition and the polyvinyl chloride K value is from 50 to 65, the proportion of additives in the molding composition is from 2 to 16% by weight and the proportion of polyester in the molding composition is from 10 to 40% by weight.

3. The molding composition as claimed in claim 1, wherein the polyvinyl chloride consists of polyvinyl chloride having a K value of 60 and is present in the molding composition in a proportion of from 60 to 62% by weight of the molding, composition, and the proportion of the polyester is from 20 to 30% by weight of the molding composition.

4. The molding composition as claimed in claim 1, wherein the proportion of the polyvinyl chloride is from 70 to 72% by weight of the molding composition and the proportion of the polyester is 15% by weight of the molding composition.

5. The molding composition as claimed in claim 1, wherein the molding composition comprises one or more additives selected from the group of modifiers, high-molecular-weight polymers, stabilizers, waxes, antiblocking agents, colorants, plasticizers, and processing aids.

6. The molding composition as claimed in claim 1, wherein the polyester is in powder form, pellet form, or granule form.

7. Films, webs, profiles, sheets, or moldings comprising the molding composition as claimed in claim 1.

8. The molding composition as claimed in claim 1, wherein polyester is the modifier for orientability in lieu of copolymer composed of vinyl chloride and vinyl acetate.

9. The molding composition as claimed in claim 1, wherein said additives are selected from the group consisting of stabilizers, waxes, antiblocking agents, colorants, plasticizers, and processing aids.

10. The molding composition as claimed in claim 1, wherein the polyvinyl chloride, prepared by the bulk, emulsion, or suspension process, makes up from 65 to 75% by weight of the molding composition and consists of polyvinyl chloride having a K value of from 50 to 65, and the proportion of the polyester is from 12 to 20% by weight of the molding composition.

11. The molding composition as claimed in claim 10, wherein the proportion of the polyester is 15% by weight of the molding composition.

12. The molding composition as claimed in claim 1, wherein the polyvinyl chloride consists of polyvinyl chloride having a K value of 60 and comprises a proportion of from 60 to 62% by weight of the molding composition, and the polyester comprises a proportion of from 23 to 27% by weight of the molding composition.

13. The molding composition as claimed in claim 12, wherein the polyester comprises 25% by weight of the molding composition.

14. The molding composition as claimed in claim 1, wherein the polyvinyl chloride consists of polyvinyl chloride having a K value of 60 and comprises a proportion of from 50 to 52% by weight of the molding composition, and the polyester makes up a proportion of from 32 to 37% by weight of the molding composition.

15. The molding composition as claimed in claim 14, wherein the polyester comprises 35% by weight of the molding composition.

16. The molding composition as claimed in claim 1, wherein the molding composition comprises vinyl chloride polymer whose K value is from 50 to 65 in a proportion of from 55 to 70% by weight of the molding composition and vinyl chloride polymer whose K value is from 70 to 90 in a proportion of from 15 to 25% by weight of the molding composition.

17. The molding composition as claimed in claim 16, wherein the vinyl chloride polymer comprises vinyl chloride copolymer which contains, as comonomer, ethylene, propylene, or vinyl acetate in a proportion of from 1 to 45% by weight of the vinyl chloride copolymer.

18. A film comprising the molding composition as claimed in claim 1, wherein the molding composition is extruded or calendered to give an unoriented film having a thickness of from 100 µm to 1 mm and is oriented in an in-line and/or off-line process having a degree of stretching of from 3 to 7.

19. Thermoformable and/or orientable film comprising film as claimed in claim 18.

20. Packaging film, shrink film, furniture film, wallcovering film, inscribable film or printable film comprising film as claimed in claim 18.

21. A film as claimed in claim 18, wherein the degree of stretching is from 3 to 4.

22. The film as claimed in claim 18, wherein the thickness of the oriented film is from 20 µm to 800 µm.

23. The film as claimed in claim 22, wherein the thickness of the film is from 35 to 200 µm.

24. The film as claimed in claim 22, wherein the haze of an oriented film whose thickness is 50 µm is from 2 to 5% and the haze rises with increasing film thickness.

25. The film as claimed in claim 22, wherein the pasteurization temperature is between greater than 50° C. and 90° C.

26. The film as claimed in claim 22, wherein the dimensional change in the film via transverse shrinkage at a temperature of 75° C. is in the range from 20 to 70%.

27. The film as claimed in claim 22, wherein the chromaticity coordinates of the film are in the following ranges: L*=from 91 to 93, a*=from −0.2 to +0.2, and b*=from 3 to 4.

28. The film as claimed in claim 22, wherein the longitudinal/transverse modulus of elasticity is from 1400 to 3500 N/mm$^2$/from 1400 to 3500 N/mm$^2$ for film thickness in the range from 50 to 200 µm.

29. The film as claimed in claim 22, wherein the canting radius of the film at a temperature of 100° C. is from 1.2 to 2.0 mm.

30. The film as claimed in claim 29, wherein the canting radius of the film at a temperature of 100° C. is from 1.4 to 1.8 mm.

31. A process for producing a film or of a film web comprising a molding composition as claimed in claim 1, said process comprising
   (a) mixing (i) polyvinyl chloride or vinyl chloride polymer having a K value of from 50 to 90, either in powder form, pellet form, or granule form in an amount of from 5 to 94% by weight of the molding composition with (ii) additives in a proportion of from 2 to 25% by weight of the molding composition;
   (b) adding a semicrystalline or amorphous polyester in powder form, pellet form, or granule form, said polyester present in a proportion of from 5 to 90% by weight of the molding composition;
   (c) plastifying and melting the molding composition prepared as in steps (a) and (b);
   (d) extruding or calendering the molten molding composition to produce a film or film web at temperatures of from 150 to 250° C., and, optionally,
   (e) orienting the film or film web in an in-line or off-line process, using a degree of stretching of from 3 to 7.

32. The process as claimed in claim 31, wherein the vinyl chloride polymer comprises a pulverulent vinyl chloride polymer having a K value of from 50 to 65 in a proportion of from 55 to 70% by weight of the molding composition and a pulverulent vinyl chloride polymer having a K value of from 70 to 90 in a proportion of from 15 to 25% by weight of the molding composition, the pulvernlent vinyl chloride polymers being mixed with one another, said process further comprising adding the sernicrystalline or amorphous polyester in powder form, pellet form, or granule form in a proportion of from 10 to 35% by weight of the molding composition and additives in a proportion of from 5 to 25% by weight of the molding composition to form the molding composition, and plastifying and melting the resultant molding composition, and extruding or calendaring die molten molding composition to produce a film.

33. The process as claimed in claim 31, wherein the surface of the film is rendered matt and rough by a rolling-bank calendering process.

34. The process as claimed in claim 31, wherein the surface of the film is smoothed and given high gloss using calender rolls ground so as to be smooth.

35. The process as claimed in claim 31, wherein the average stretching temperature or film temperature during orientation is from 70 to 120° C.

36. The process as claimed in claim 35, wherein the molding composition in steps (a) and (b) is pregelled in a kneader, on mixing rolls, or in an extruder to about 130-190° C. and is then molded via extrusion or calendering on a 3- to 6-roll calender to produce the film or the film web.

37. A process as claimed in claim 35, wherein the average stretching temperature or film temperature during orientation is 100° C.

38. A calenderable molding composition comprising (i) vinyl chloride polymer or polyvinyl chloride in an amount of from 50 to 80% by weight, said vinyl chloride polymer or polyvinyl chloride consists of vinyl chloride polymer or polyvinyl chloride having a K value of from 50 to 65, (ii) additives making up from 2 to 16% by weight, and (iii) a polymer comprising semicrystalline or amorphous polyester whose crystallization half-life time in the molten state is at least equal to or greater than 5 minutes, wherein the molding composition is a blend of vinyl chloride polymer or polyvinyl chloride and of the polyester as modifier for orientability, and the foregoing percentages by weight are based on the total weight of the molding composition, and a film formed from said molding composition is oriented using a transverse stretching ratio of from 3 to 7, wherein the proportion of polyester in the molding composition is from 10 to 40% by weight and a film formed from said molding composition having a thickness of 200 microns exhibits a tensile impact resistance in the longitudinal direction ranging from 230 to 330 kJ/m$^2$ and a tensile impact resistance in the transverse direction ranging from 330 to 420 kJ/m$^2$.

* * * * *

UNITED STATES PATENT AND TRADEMARK OFFICE
CERTIFICATE OF CORRECTION

PATENT NO. : 8,822,020 B2  
APPLICATION NO. : 11/814252  
DATED : September 2, 2014  
INVENTOR(S) : Thorsten Grigo et al.

Page 1 of 1

It is certified that error appears in the above-identified patent and that said Letters Patent is hereby corrected as shown below:

In the Claims

| | |
|---|---|
| Column 12, Line 53 | change "calendared" to --calendered--; delete ";" after molding |
| Column 14, Line 63 | change "sernicrystalline" to --semicrystalline-- |
| Column 15, Line 2 | change "calendaring" to --calendering--; change "die" to --the-- |

Signed and Sealed this
Twenty-fifth Day of November, 2014

Michelle K. Lee
*Deputy Director of the United States Patent and Trademark Office*